United States Patent [19]

Gauger

[11] Patent Number: 4,629,857
[45] Date of Patent: Dec. 16, 1986

[54] STUD-WELDING DEVICE

[75] Inventor: Wolfgang Gauger, Menden, Fed. Rep. of Germany

[73] Assignee: Obo Bettermann Org., Menden, Fed. Rep. of Germany

[21] Appl. No.: 710,858

[22] Filed: Mar. 12, 1985

[30] Foreign Application Priority Data

Mar. 12, 1984 [DE] Fed. Rep. of Germany ....... 3408930

[51] Int. Cl.⁴ .............................................. B23K 9/20
[52] U.S. Cl. ..................................................... 219/98
[58] Field of Search .................. 219/99, 98; 279/19.1, 279/77

[56] References Cited

U.S. PATENT DOCUMENTS 2,816,210 12/1957 Mowry ................................... 219/98
4,145,596 3/1979 Pignal ..................................... 219/98

FOREIGN PATENT DOCUMENTS 2075889 10/1981 United Kingdom .................. 219/98
737623 6/1980 U.S.S.R. ............................. 279/19.1

Primary Examiner—E. A. Goldberg
Assistant Examiner—C. W. Sigda
Attorney, Agent, or Firm—Karl F. Ross; Herbert Dubno

[57] ABSTRACT

A stud-welding apparatus in which the chuck is axially displaceable to bring the stud into engagement with a detent past which the stud has been propelled so that the stud is held as retraction of the chuck sets the stud in the mouth thereof. The chuck is then advanced to carry the stud away from the detent and into engagement with a workpiece so that the welding current does not affect the detent and mechanical stress is not applied thereto during the welding operation.

10 Claims, 4 Drawing Figures

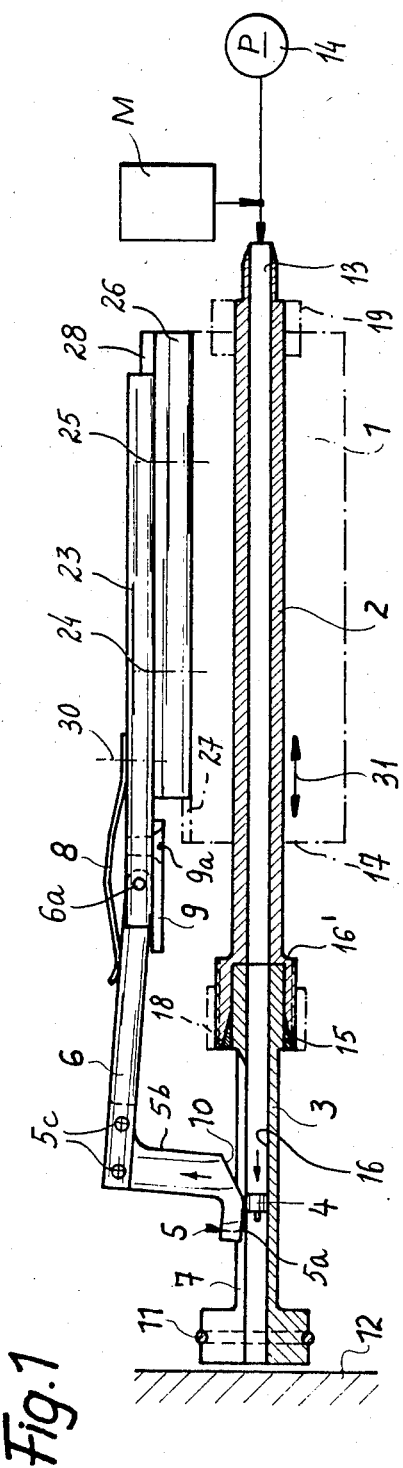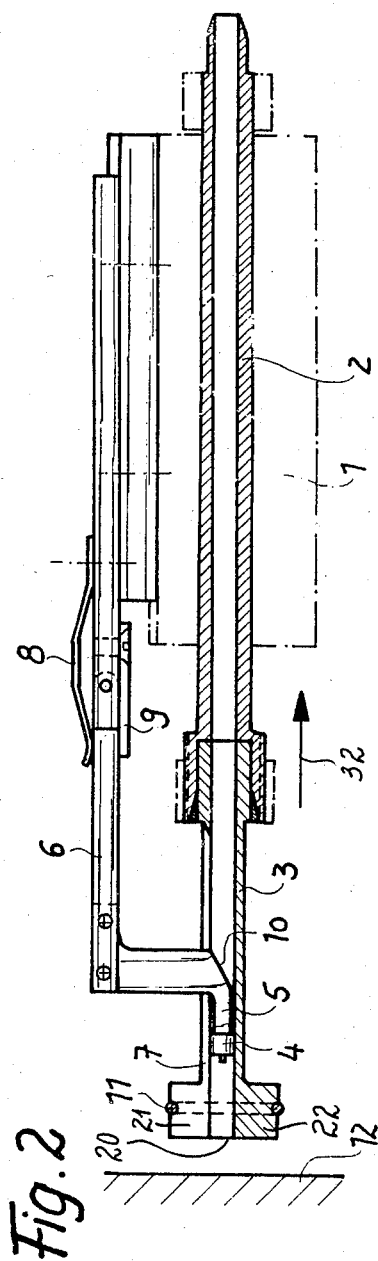

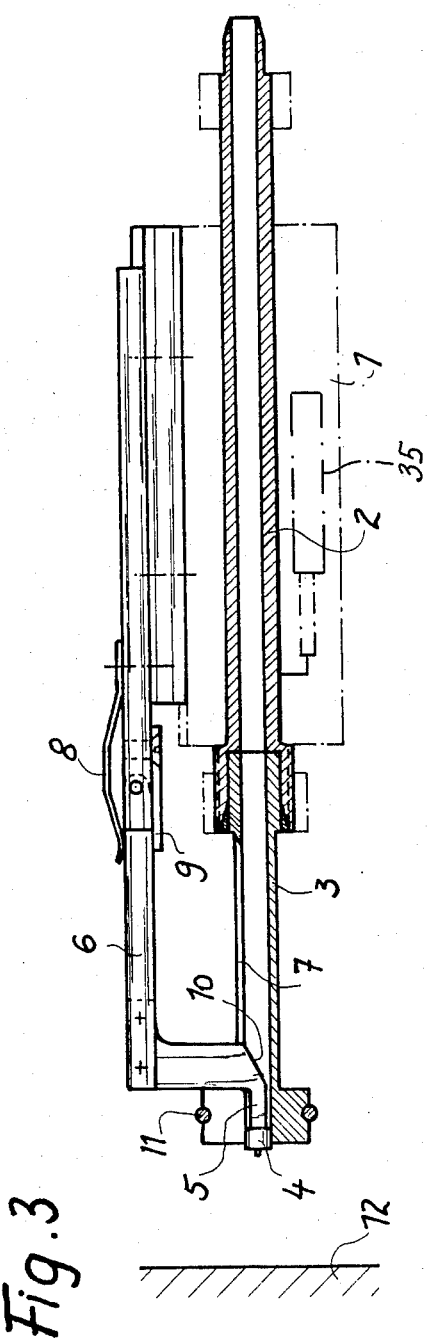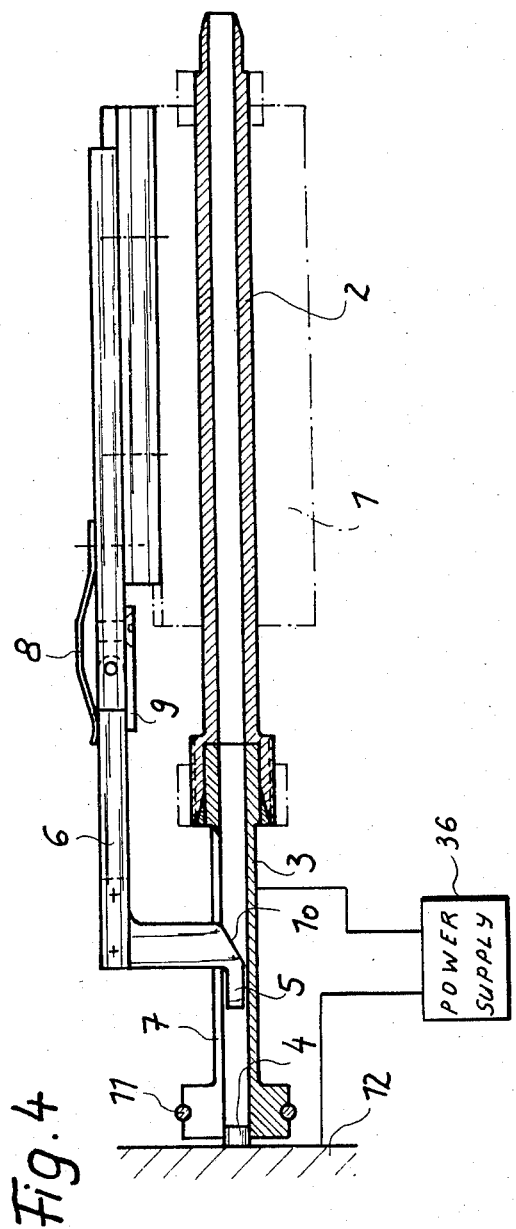

STUD-WELDING DEVICE

FIELD OF THE INVENTION

My present invention relates to a stud-welding device and, more particularly, to a stud welder of the type in which a succession of studs can be fed through a stud feed tube to a retaining end of the device in which the stud can be held as it is pressed against a substrate, support, beam or plate, to which the stud is to be affixed by passage of a welding current between the stud and the support.

BACKGROUND OF THE INVENTION

A stud welder is known from U.S. Pat. No. 2,816,210, for example, which describes a tool through a tube of which the studs are fed in succession to a chuck, collet or holder at the end of the tube. A detent is generally provided in the chuck, which can be removable and replaceable, and which, once passed by the advancing stud, serves to prevent reverse movement of the stud relative to the tube past this detent.

In the arrangement disclosed in this patent, the detent is mounted on the chuck and for the positioning of a stud in the chuck, the latter is retracted into a rearmost position together with the feed passage, a stud is advanced to the chuck for example by compressed air so that it passes the detent and then is blocked from reverse movement, and the chuck is advanced with the leading end of the stud projecting therefrom until it engages the workpiece or support relative to the housing within which the chuck is movably mounted.

During this movement and as the stud is pressed against the workpiece or support, the detent continues to engage the stud as an essential positioning element and as a means for applying pressure to the stud against the workpiece.

The detent thus extends through a bore which is at a right angle to the longitudinal dimension of the chuck and is movable.

For the detent to function, it must apply considerable mechanical force to the stud and thus undergoes significant mechanical stress in turn so that wear is an important problem.

Since the detent maintains contact with the stud during the welding action, the welding current is applied at least in part through the detent and contact resistances can cause electric arcs to jump between the detent and the stud which can cause deteriorioation of the detent and/or its guideway and thus be detrimental to the appropriate movement of the stud.

Furthermore, since the detent is usually provided to engage the edge of the stud, it is possible that a stud is relatively short (e.g. when the axial length of the stud is equal of less than its diameter as is frequently desired), a tilting or canting of the stud can occur relative to the detent to block the operation of the device and require dismantiling or other corrective means.

Not only is there a danger that a stud may become misaligned within the device to block its operation, but there is always the danger that misaligned studs will not be welded with positional accuracy or orientation to the workpiece or support.

OBJECTS OF THE INVENTION

It is, therefore, the principal object of the present invention to provide an improved stud welder or bolter which overcomes the disadvantages of the aforedescribed prior art systems.

Another object of the invention is to provide a stud-welding device which can handle comparatively short studs with relative ease and without the danger of mispositioning or misalignment of the studs, and with reduced tendency to jamming and like interruptions in the stud-welding operations.

Yet another object of this invention is to provide a stud welder in which wear and deterioration of the detent and its guideways poses less of a problem.

SUMMARY OF THE INVENTION

These objects and others which will become apparent hereinafter are attained, in accordance with the invention, in a stud-welding device of the aforedescribed type wherein the detent is mounted upon the housing and engages in the stud-receiving chuck at the end of the stud feed chute. The chuck is constructed and arranged so that in its forwardmost position, i.e. in the limiting position of advance in the direction of the workpiece, it is in its starting position and the stud can thus pass the detent at least before the chuck has been retracted into its rearmost position. As a consequence, when the chuck is so retracted, the stud can be brought into engagement with the detent and thus properly set in the mouth of the chuck so that with renewed advance of the feed tube and the chuck, the stud can be carried into engagement with the workpiece and welded thereto, the stud being then removed from contact with the detent. Means is advantageously provided for effecting the stroke of the chuck from its forwardmost position to its rearmost position and then back into the forward or welding position.

In this manner, the movement of the stud past the detent is effected by compressed air while the chuck is in its forward position, and upon retraction of the chuck into its rearmost position, the rear end of the stud engages the detent and is thereby pressed into the expandable mouth of the chuck in a well-defined aligned and oriented position.

Upon the forward movement of the chuck which follows, the mouth of the chuck carries the stud away from the detent so that when the welding process is effected, discharge is precluded between the detent and the stud.

By comparison with the prior art device, therefore, the stud is moved away from the detent and there is neither mechanical nor electrical stress upon the detent during the welding action.

Another advantage of the invention is that subsequent to the welding operation and before withdrawal of the spring-loaded end of the chuck from the stud welded to the workpiece, another bolt may be sent on its way to the chuck and past the detent so that this previously welded bolt still in the mouth of the chuck can prevent the oncoming stud from passing through the mouth and being lost.

The studs can be directed to the chuck at a comparatively high rate so that the time between applications of the studs to the workpiece is minimal.

To further preclude distortion or damage to the detent, the latter may be provided with a right-angle configuration, i.e. can have a finger extending axially in the chuck and an arm connected to this finger and forming a right angle therewith, the arm extending through an elongated slot in the chuck and being massive by comparison to the finger.

This detent may be detachably mounted on a lever which is swingable on the housing so that it can be moved and replaced by detents dimensioned to suit the various lengths of studs which may be employed.

Naturally, instead of replacing the detent on the lever, the lever carrying the detent can be replaced by a longer or shorter lever to properly position the studs in the mouth of the chuck such that the desired length of stud protrudes therefrom and only the stud (and not the chuck) will be welded to the workpiece.

According to another feature of the invention, the detent, i.e. the aforementioned finger, centrally engages the rear face of the stud for seating it in the mouth of the chuck. This ensures that canting of the studs will be avoided even when relatively short studs are used.

According to another feature of the invention, the finger has a diameter which substantially equals the diameter of the chuck passage through which the stud is propelled by the compressed air at least when the detent is in its position intended to seat the stud in the mouth of the chuck. In this position the arm of the detent preferably extends at right angles to the passage while the finger is perpendicular to the end face of the stud.

A rearwardly facing portion of the detent can be provided with a bevel inclined to the axis of the chuck passage over its entire length within the chuck passage so that the detent can be readily cammed outwardly by the advancing stud.

The lever can be a bent or offset lever, one end of which is fulcrumed or pivotally mounted on a portion of the housing while the other end is formed as the aforementioned detent. The bevel or ramp thus can be formed opposite a right angle defined between the finger and the arm.

The lever can be biased by a spring into the chuck passage through a slot in the wall thereof, the spring being most advantageously a leaf spring bridging the pivot and bearing upon the lever.

To adjust the axial stroke of the chuck to accommodate a particular length of the stud to be welded to the workpiece, abutments can be provided on the housing and on the feed tube to which the chuck is connected. Any other abutment arrangement (i.e. one of the feed tube and chuck can be provided with an abutment for stepless adjustment) can be provided for this purpose as well. The detent and the lever carrying it can likewise be adjusted parallel to the stroke of the chuck so that the position of the detent in which it engages the stud to set it in the mouth of the chuck can be adjusted.

The chuck mouth can be formed by jaws resiliently biased inwardly to snugly receive and hug the stud.

BRIEF DESCRIPTION OF THE DRAWING

The above and other objects, features and advantages of the present invention will become more readily apparent from the following description, reference being made to the accompanying drawing in which:

FIG. 1 is a side elevational view of a stud-welding device partly shown in longitudinal section and illustrating the position in which a stud is being propelled through the chuck by compressed air;

FIG. 2 is a similar view of the device showing an initial stage in the setting stud in the chuck;

FIG. 3 is a corresponding view showing the final stage of the seating of the bolt in the chuck; and FIG. 4. is a similar view illustrating the positions of the elements of welding of the stud to the workpiece.

SPECIFIC DESCRIPTION

In the drawing I have shown part of a stud-welding device, the remaining appurtenances of which are standard in the art (see the forementioned reference) and will not be described, these appurtenances including the holder, the mechanism for moving the feed tube and the chuck and the switching means for passing the welding current between the chuck and the workpiece.

The housing has been represented generally at 1 and receives axially slidably, a feed tube 2 which can be connected to a magazine represented at M through which a succession of studs can be fed to the feed tube passage 13, the studs, one of which can be seen at 4, being advanced by compressed air from a compressor 14.

The axial shiftability and hence the position of the chuck 3, connected by a coupling 15 to the feed tube 2 so that is passage 16 is aligned with the passage 13, is defined by a shoulder 16' which is engageable with a wall 17 of the housing or by a stop sleeve 18 threaded into the feed tube and engageable by an abutment on the housing.

The housing can also include a surface engageable with another stop sleeve 19 threaded onto the opposite end of the feed tube.

The detent 5 extends into the chuck 3 whose mouth 20 is defined by spring-loaded jaws 21, 22, separated by axially extending slits 7 and biased inwardly by a spring ring 11.

The detent 5 extends through the slit 7 and comprises a finger 5a which, in the stud-setting position shown in FIG. 2, extends axially in the passage 16 and which lies at a right angle to an arm 5b projecting laterally through this slit and connected by bolts 5c to a tongue of a lever 6. Upon loosening of the bolt 5c, the detent 5 can be replaced to substitute detents with fingers 5a of different lengths for the fingers shown.

The lever 6, in turn, has a fulcrum 6a on a bar 23 and its swing in the direction of the chuck 3 can be limited by a stop or abutment 9 bolted at 9a to the bar. A leaf spring 8 bridging the pivot 6a urges the lever 6 in a counterclockwise sense, i.e. into the position shown in FIG. 2. A pair of bolts diagrammatically represented at 24 and 25 is connected to a guideway 26 on the housing 1 so that is is slidable along a track represented at 27 and can be adjusted along this track and locked in place.

The guideway 26 also has a track 28 along which the bar is shiftable and in which the bar can be clamped by a bolt represented diagrammatically at 30. The bolt and guideway arrangement allows adjustment of the lever in a direction parallel to the direction of movement of the feed tube and chuck represented by the arrow 31. The pin forming the pivot 6a can likewise be removed to permit levers 6 of different lengths to be substituted.

The spring 8 bears upon the lever 6 to bias the lever 6 into its rest position as is illustrated in FIGS. 2-4 in which the finger 5a, forming the end of the lever assembly lies coaxial to the chuck 3. As noted, this position is limited by the stop or abutment 9.

The side of the detent 5 turned away from the mouth 20 of the chuck is provided with an inclined ramp or bevel 10 which is engaged by the oncoming stud (see FIG. 1) propelled through the feed tube and chuck by compressed air from a flexible line connected to the device so that the detent 5 and the lever 6 are swung outwardly and the stud 4 can pass the detent 5, the latter springing back into the passage behind the stud.

The lumen or free cross section of the feed passage 13 and the chuck passage 16 is, with respect to the stud cross section or diameter, only sufficient to enable the stud to pass axially through the device 1 without any margin enabling canting or jamming of the stud.

The spring force provided by the annular spring 11 acting on the chuck jaws exerts a sufficient clamping force to hold the stud in a positionally correct orientation for welding. The chuck is in its advanced position shown in FIG. 1 when the next step is propelled past the detent as shown and indeed, the chuck can still be in engagement with the previously welded stud.

When the stud is past the detent and the finger 5a springs back into a coaxial position within the passage 16, retraction of the chuck in the direction of arrow 32 can spring the rear end of the stud into engagement with the finger which practically fills the cross section of the passage 16 as shown and centrally engages the rear surface of the stud.

Further retraction of the chuck while the stud is held against movement by the detent 5, firmly lodges the stud in the mouth of the chuck as can be seen from FIG. 3, the extent to which the stud projects from the chuck, for any given length of stud, being adjustable by the stepless control afforded by the abutments and the positioning of the detent in the manner already described. The movement of the chuck and the feed tube can be effected by a pneumatic cylinder shown only diagrammatically at 35 in FIG. 3.

Once the stud has been set in the mouth of the chuck (FIG. 3), the drive is reversed to carry the stud away from the detent 5 and into engagement with the workpiece 12, whereupon the welding current is passed between the chuck and the workpiece via a power supply 36 to thereby weld the stud to the workpiece.

This position can correspond to the starting position shown in FIG. 1 so that the process can be rapidly repeated.

I claim:

1. A stud-welding apparatus comprising:
   a housing;
   a tubular chuck connected to a feed tube and axially shiftable on said housing, said chuck having a bore traversable by a stud which is of constant diameter over its length traversed by a stud;
   a detent mounted on said housing and swingable on a pivot fixed relative to said housing and defining a pivot axis for said detent which is located outwardly of said chuck, said chuck having a lateral opening through which an end of said detent projects into said chuck;
   means for feeding a stud through said tube and into said chuck past said detent, thereby deflecting said detent and enabling said detent to return to an original position in said chuck while said chuck is in an advanced position having a chuck mouth spaced from said detent, said end of said detent reaching into said chuck behind said stud;
   means for retracting said chuck to bring said stud into engagement with said detent in the original position thereof and for thereafter again advancing said chuck to carry said stud away from said detent and out of electrical contact therewith, and to weld said stud onto a workpiece; and
   means for setting an axial stroke of said chuck relative to said original position of said detent.

2. The apparatus defined in claim 1 wherein said detent is mounted on a lever pivotally connected to said housing for movement between limiting positions, said detent having a right angle structure.

3. The apparatus defined in claim 2, further comprising means for replaceably mounting said detent on said lever.

4. The apparatus defined in claim 2, further comprising means for replaceably mounting said lever on said housing.

5. The apparatus defined in claim 2 wherein said detent comprises a finger coaxial with a passage of said chuck in said original position and centrally engageable with a rear end of said stud.

6. The apparatus defined in claim 5 wherein said finger extends perpendicularly to said rear end of said stud, said finger having a diameter substantially equal to the full diameter of said passage.

7. The apparatus defined in claim 2 wherein said detent is formed by a lever bent at right angles, one end of which forms said detent and another end of which is connected pivotally to said housing.

8. The apparatus defined in claim 2, further comprising a spring engaging said lever and biasing said detent into said original position.

9. The apparatus defined in claim 2 wherein one of said feed tube and said chuck is provided with an abutment for stepless adjustment of the position of said chuck relative to said housing.

10. The apparatus defined in claim 2 wherein said chuck is provided with jaws, further comprising an annular spring lodging said jaws inwardly adjacent said mouth.

* * * * *